US009762770B2

(12) United States Patent
Tachikawa et al.

(10) Patent No.: US 9,762,770 B2
(45) Date of Patent: Sep. 12, 2017

(54) IMAGE PROCESSING APPARATUS HAVING DYNAMICALLY RECONFIGURABLE CIRCUITS TO PERFORM IMAGE PROCESSING, CONTROL METHOD THEREOF, AND STORAGE MEDIUM STORING COMPUTER PROGRAM THEREFOR

(71) Applicant: CANON KABUSHIKI KAISHA, Tokyo (JP)

(72) Inventors: Tomohiro Tachikawa, Tokyo (JP); Kenji Hara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/948,809

(22) Filed: Nov. 23, 2015

(65) Prior Publication Data
US 2016/0182743 A1 Jun. 23, 2016

(30) Foreign Application Priority Data

Dec. 17, 2014 (JP) ................................. 2014-255442

(51) Int. Cl.
G06F 3/12 (2006.01)
H04N 1/409 (2006.01)
H04N 1/00 (2006.01)
G06K 15/00 (2006.01)

(52) U.S. Cl.
CPC ....... H04N 1/4097 (2013.01); H04N 1/00798 (2013.01)

(58) Field of Classification Search
CPC ............ G06F 15/7867; H04N 1/00082; H04N 1/00204; H04N 1/0032; H04N 1/00037; H04N 1/00092; H04N 1/00912; H04N 1/4097; H04N 2201/0084; H04N 2201/0094
USPC ...................... 358/474, 488, 1.13, 1.15, 1.16
See application file for complete search history.

(56) References Cited

U.S. PATENT DOCUMENTS

| 6,049,222 | A | * | 4/2000 | Lawman | ............. | G06F 17/5054 |
| | | | | | | 326/38 |
| 7,474,437 | B2 | | 1/2009 | Ishido | | |
| 2009/0086255 | A1 | * | 4/2009 | Duong | ................... | G06K 15/02 |
| | | | | | | 358/1.15 |
| 2015/0261478 | A1 | * | 9/2015 | Obayashi | ........... | H04N 1/00896 |
| | | | | | | 358/1.15 |

(Continued)

FOREIGN PATENT DOCUMENTS

| JP | 2002176542 A | 6/2002 |
| JP | 2002199222 A | 7/2002 |
| JP | 2003348336 A | 12/2003 |

(Continued)

Primary Examiner — Gabriel Garcia
(74) Attorney, Agent, or Firm — Rossi, Kimms & McDowell LLP

(57) ABSTRACT

Image processing corresponding to each of a plurality of pages of image data to be acquired as a target for job execution is determined. An image processing circuit that executes the determined image processing is configured in a logic device capable of dynamically configuring circuits. The image processing circuit configured in the logic device is caused to execute the determined image processing each of the plurality of pages of the image data acquired.

15 Claims, 12 Drawing Sheets

(56) References Cited

U.S. PATENT DOCUMENTS

2016/0036998 A1\* 2/2016 Goda .................. H04N 1/0097
358/1.13
2016/0057305 A1\* 2/2016 Suzuki ............... H04N 1/00912
358/1.13

FOREIGN PATENT DOCUMENTS

| JP | 2005184101 A | 7/2005 |
| JP | 2006173933 A | 6/2006 |
| JP | 2013098823 A | 5/2013 |

\* cited by examiner

FIG. 3

| | |
|---|---|
| FOREIGN MATTER + ODD PAGE | CONFIGURATION DATA 0 (CIRCUIT DATA FOR PERFORMING FOREIGN MATTER CORRECTION BUT NOT MIRROR IMAGE PROCESSING) |
| NO FOREIGN MATTER + ODD PAGE | CONFIGURATION DATA 1 (CIRCUIT DATA FOR NOT PERFORMING FOREIGN MATTER CORRECTION OR MIRROR IMAGE PROCESSING) |
| FOREIGN MATTER + EVEN PAGE | CONFIGURATION DATA 2 (CIRCUIT DATA FOR PERFORMING FOREIGN MATTER CORRECTION AND MIRROR IMAGE PROCESSING) |
| NO FOREIGN MATTER + EVEN PAGE | CONFIGURATION DATA 3 (CIRCUIT DATA FOR PERFORMING MIRROR IMAGE PROCESSING BUT NOT FOREIGN MATTER CORRECTION) |

300

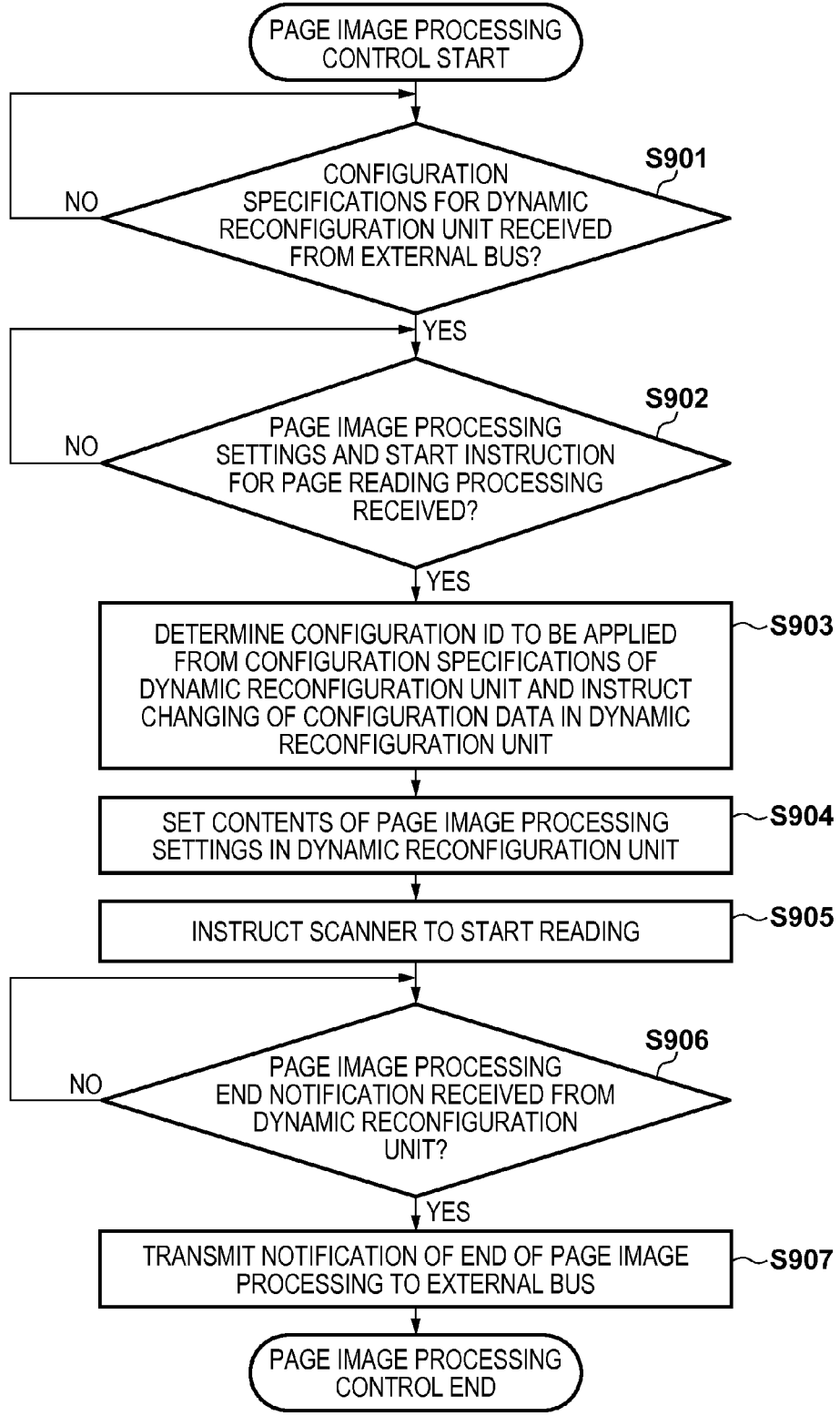

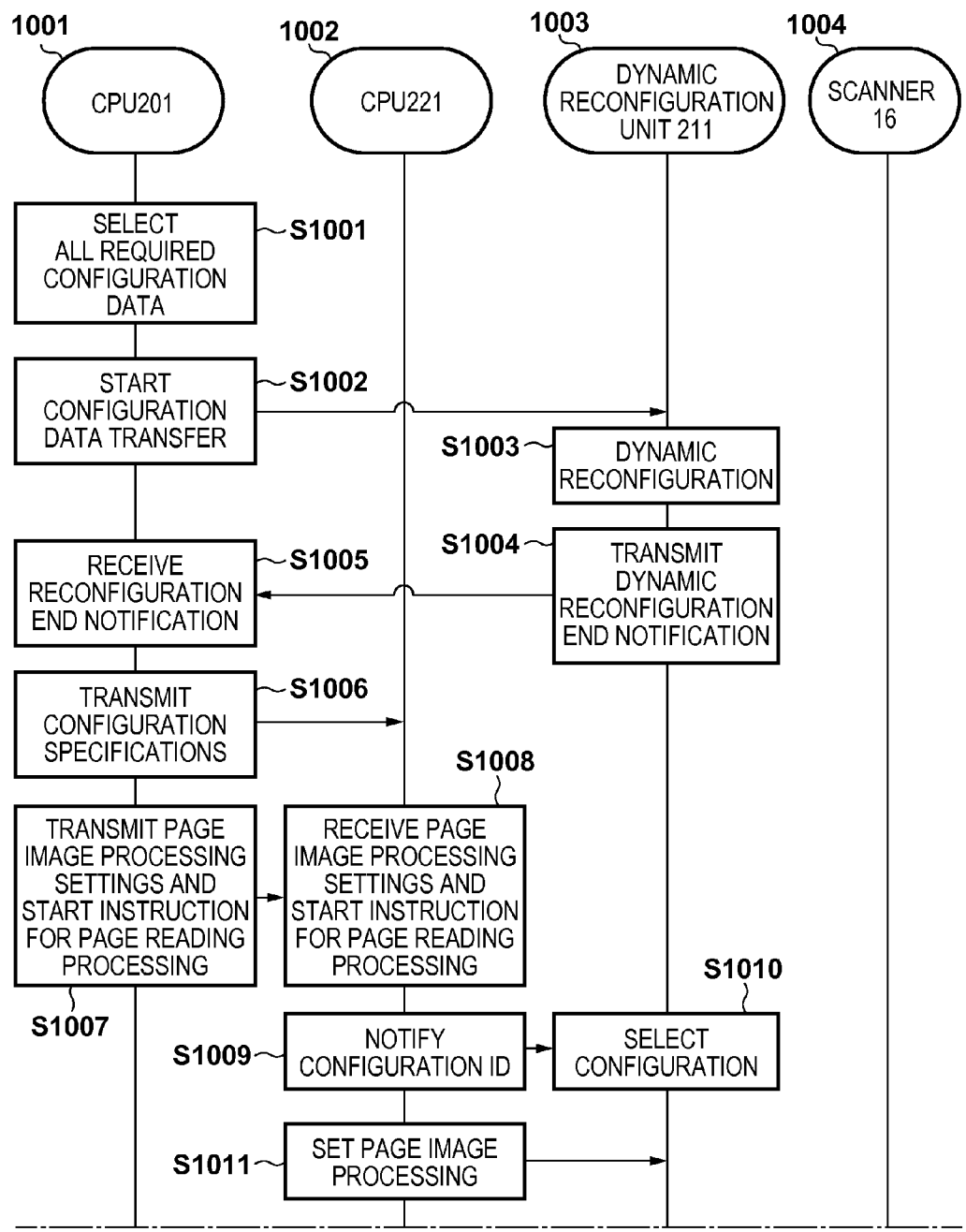
F I G. 10A

IMAGE PROCESSING APPARATUS HAVING DYNAMICALLY RECONFIGURABLE CIRCUITS TO PERFORM IMAGE PROCESSING, CONTROL METHOD THEREOF, AND STORAGE MEDIUM STORING COMPUTER PROGRAM THEREFOR

BACKGROUND OF THE INVENTION

Field of the Invention

The present invention relates to an image processing apparatus that performs image processing on image data, a control method and a storage medium that stores a computer program.

Description of the Related Art

In recent years, controllers for performing device control within an MFP (multifunctional peripheral) that are constituted by a high-speed general-purpose CPU and an image processing control CPU are known. In such a configuration, the general-purpose high-speed CPU performs general-purpose interface control of a network or the like and job sequence control, for example. Also, the image processing control CPU performs control of a document reading apparatus (scanner) and image processing control, for example. A print function and a scan function of the MFP are executed by the general-purpose high-speed CPU and the image processing control CPU operating in tandem.

There are cases where different image processing is required per page when executing a scan job. For example, the MFP may be configured to detect the presence of foreign particles between pages by reading the white plate or the document guide plate (Japanese Patent Laid-Open Nos. 2002-176542 and 2006-173933). In this case, whether or not to perform pixel correction corresponding to the position of foreign particles is determined on a page-by-page basis, according to the presence of foreign particles.

Also, the MFP may, for example, be configured to detect whether a page is achromatic or chromatic before performing document reading (Japanese Patent Laid-Open No. 2005-184101). In this case, whether to perform achromatic image processing or chromatic image processing is determined for the next page on a page-by-page basis, according to whether the page is achromatic or chromatic.

Also, the MFP may, for example, be configured to read consecutive pages using an ADF (Auto Document Feeder). Depending on factors such as the structure of the ADF and the attachment orientation of the sensor, the reading direction may be reversed between the front and back sides of the page; that is, the image data that is obtained may be a mirror image of the original. In this case, mirror image correction for correcting the mirror image to the correct image needs to be performed on the image data of whichever of the front or back side is the mirror image.

Also, the types of reading devices that are used in MFPs include CCD image sensors, CMOS image sensors, and contact image sensors (CISs). Technology for improving the reading speed by installing two of these reading devices for respectively reading the front side and back side is known. At this time, different reading devices may be installed for reading the front and back sides, such as a CMOS image sensor for the front side and a CIS for the back side. In the case of such a configuration, circuits that correct for issues particular to CISs such as inter-chip missing pixels (Japanese Patent Laid-Open No. 2003-348336) and resolution degradation (Japanese Patent Laid-Open No. 2002-199222) will be required in the image processing for the back side of the page only.

On the other hand, devices such as programmable logic devices (PLDs) and FPGAs (Field Programmable Gate Arrays) that are capable of reconfiguring internal logic circuits are known. Generally, PLDs and FPGAs are capable of switching the function of an internal logic block by writing logic circuit configuration information stored in a nonvolatile memory such as ROM to a configuration memory, which is an internal volatile memory, at the time of startup. Also, because information in the configuration memory is cleared at the time of power off, reconfiguration is performed by writing the logic circuit configuration information to the configuration memory again at the time of power on. A method for thus configuring a hardware resource only once is called static reconfiguration.

Also, a technique for loading configuration data to an FPGA via a general-purpose high speed bus such as PCIe (PCI-Express) that is connected to the FPGA, according to computational processing of an accelerator, with the CPU as the master device, is known (Japanese Patent Laid-Open No. 2013-98823). Such methods for changing the logic circuit during device operation are referred to as dynamic reconfiguration by CPU.

By applying a device capable of dynamic reconfiguration by CPU to the system of an MFP in which a general-purpose high-speed CPU and an image processing CPU operate in tandem, it is conceivable to, for example, add a function that enables the contents of image processing on image data to be changed on a page-by-page basis. However, in order to apply a device capable of dynamic reconfiguration by CPU to the system of an MFP in which a general-purpose high-speed CPU and an image processing CPU operate in tandem, a configuration that controls image processing by coordinating dynamic reconfiguration by the CPU with jobs is required. Although Japanese Patent Laid-Open No. 2013-98823 describes a system that is configured to load configuration data to an FPGA, there is no mention of controlling image processing through coordination with jobs.

SUMMARY OF THE INVENTION

An aspect of the present invention is to eliminate the problems with the conventional technology. The present invention provides an image processing apparatus and a control method that realize image processing control at the time of job execution in a system including a device capable of dynamic reconfiguration, and a storage medium storing a program for realizing the same.

The present invention in one aspect provides an image processing apparatus comprising: an acquisition unit configured to acquire, as a target for job execution, image data that includes a plurality of pages; a logic device configured to dynamically configure a circuit; a determination unit configured to determine image processing corresponding to each of the plurality of pages of the image data to be acquired by the acquisition unit; a configuration unit configured to configure, in the logic device, an image processing circuit for executing the image processing determined by the determination unit; and a control unit configured to cause the image processing circuit configured in the logic device by the configuration unit to execute the image processing determined by the determination unit for each of the plurality of pages of the image data acquired by the acquisition unit.

According to the present invention, image processing control at the time of job execution can be realized in a system including a device capable of dynamic reconfiguration.

Further features of the present invention will become apparent from the following description of exemplary embodiments with reference to the attached drawings.

BRIEF DESCRIPTION OF THE DRAWINGS

FIG. 3 is a diagram showing a correspondence between configuration data and page settings.

FIG. 9 is another flowchart showing a procedure for image processing control on a page-by-page basis.

FIGS. 10A and 10B are other diagrams showing a sequence of image processing control on a page-by-page basis.

DESCRIPTION OF THE EMBODIMENTS

Figure 1:
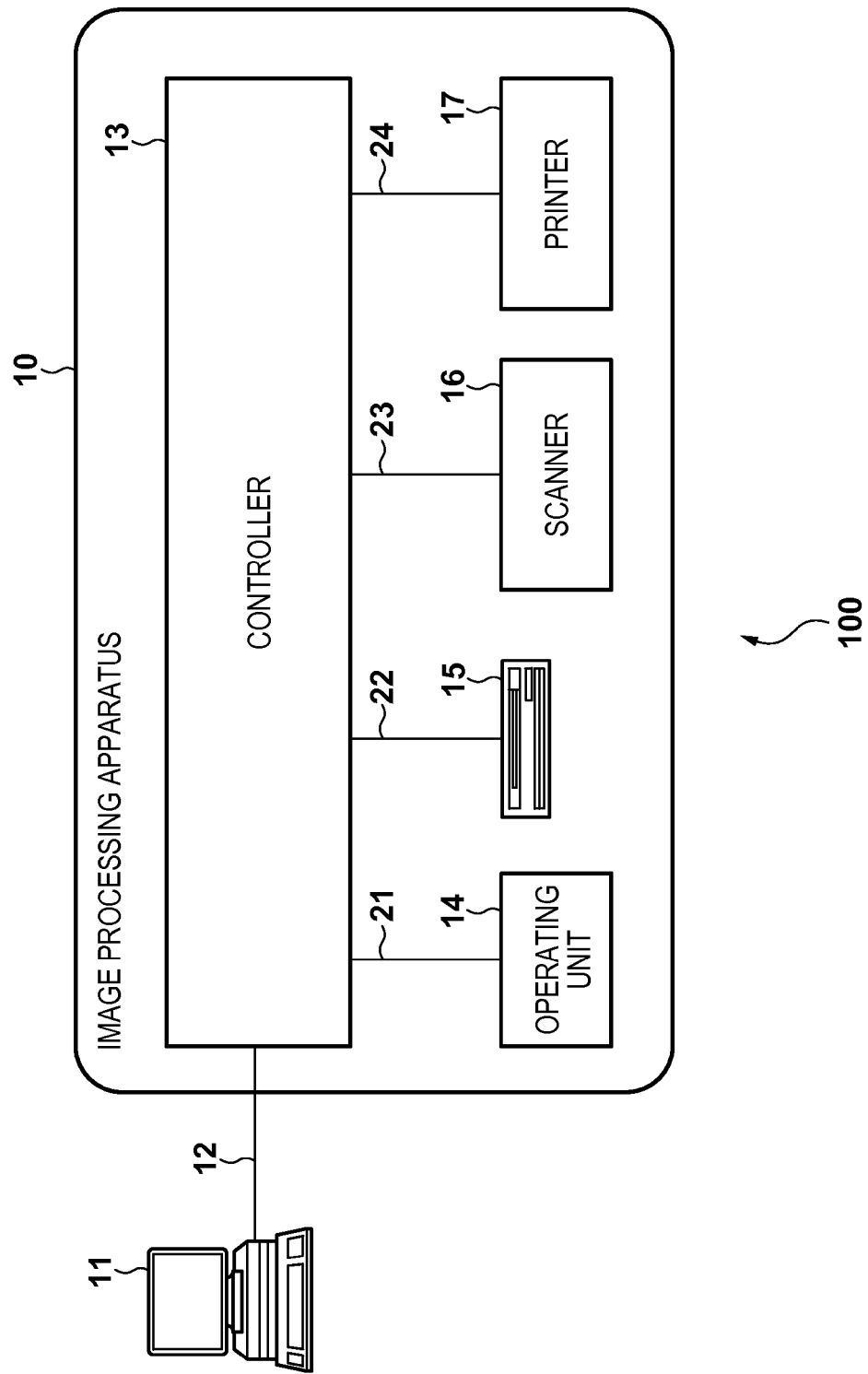
FIG. 1 is a diagram showing a system configuration including an image processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals are given to constituent elements that are the same, and description thereof will be omitted.

First Embodiment

Configuration of Image Forming Apparatus

FIG. 1 is a diagram showing a system configuration including an image processing apparatus. A system 100 includes an image processing apparatus 10 and an information processing apparatus 11. The image processing apparatus 10 includes a controller 13, an operating unit 14, a storage device 15, a scanner 16, and a printer 17. The image processing apparatus 10 is used as a multifunctional peripheral (MFP) that includes a print function, a reading function and a fax function, for example. The image processing apparatus 10 is communicably connected to the information processing apparatus 11, which is a PC or the like, via a network 12 such as a LAN. The image processing apparatus 10 executes the functions of the image processing apparatus 10 based on jobs received from the information processing apparatus 11. The jobs are jobs corresponding to the functions executable by the image processing apparatus 10, and include scan jobs and print jobs, for example. Also, jobs may be received from a user via the operating unit 14, in addition to being received from the information processing apparatus 11.

The scanner 16 optically reads images from a document placed on a platen or from a document supplied continuously from an ADF (Automatic Document Feeder), and converts the read images to image data. The printer 17 prints images to printing media such as print sheets based on the image data, using an electrophotographic printing method or an inkjet printing method. Here, image data may be generated by the scanner 16 or may be acquired externally. The operating unit 14 receives user instruction operations regarding functions that are executable by the image processing apparatus 10. The storage device 15 is a hard disk, for example, and stores image data and programs, as well as logic circuit configuration information (configuration data) for forming circuits in a logic device capable of dynamically reconfiguring internal circuits. Hereinafter, the storage device 15 will be described as being a hard disk 15. An FPGA (Field Programmable Gate Array), for example, is used as the logic device of the present embodiment.

The controller 13 is connected to each of the modules from the operating unit 14 to the printer 17 in a bus configuration, and executes jobs by controlling the modules. The operating unit 14 is connected to the controller 13 via an operating unit bus 21. The hard disk 15 is connected to the controller 13 via a hard disk bus 22. The scanner 16 is connected to the controller 13 via a scanner bus 23. The printer 17 is connected to the controller 13 via a printer bus 24. The network 20 may be a wired network or a wireless network. In the case of a wireless network, the information processing apparatus 11 is, for example, a mobile terminal. In the case where the network 20 is constituted by a wireless network, access points or the like may be configured on the network 20.

In the case where the copy function is executed in the image processing apparatus 10, image data generated with the scanner 16 is output to the controller 13 via the scanner bus 23. The controller 13 controls the printer 17 via the printer bus 24 so as to print to printing media such as print sheets with the printer 17, based on the image data.

Figure 2:
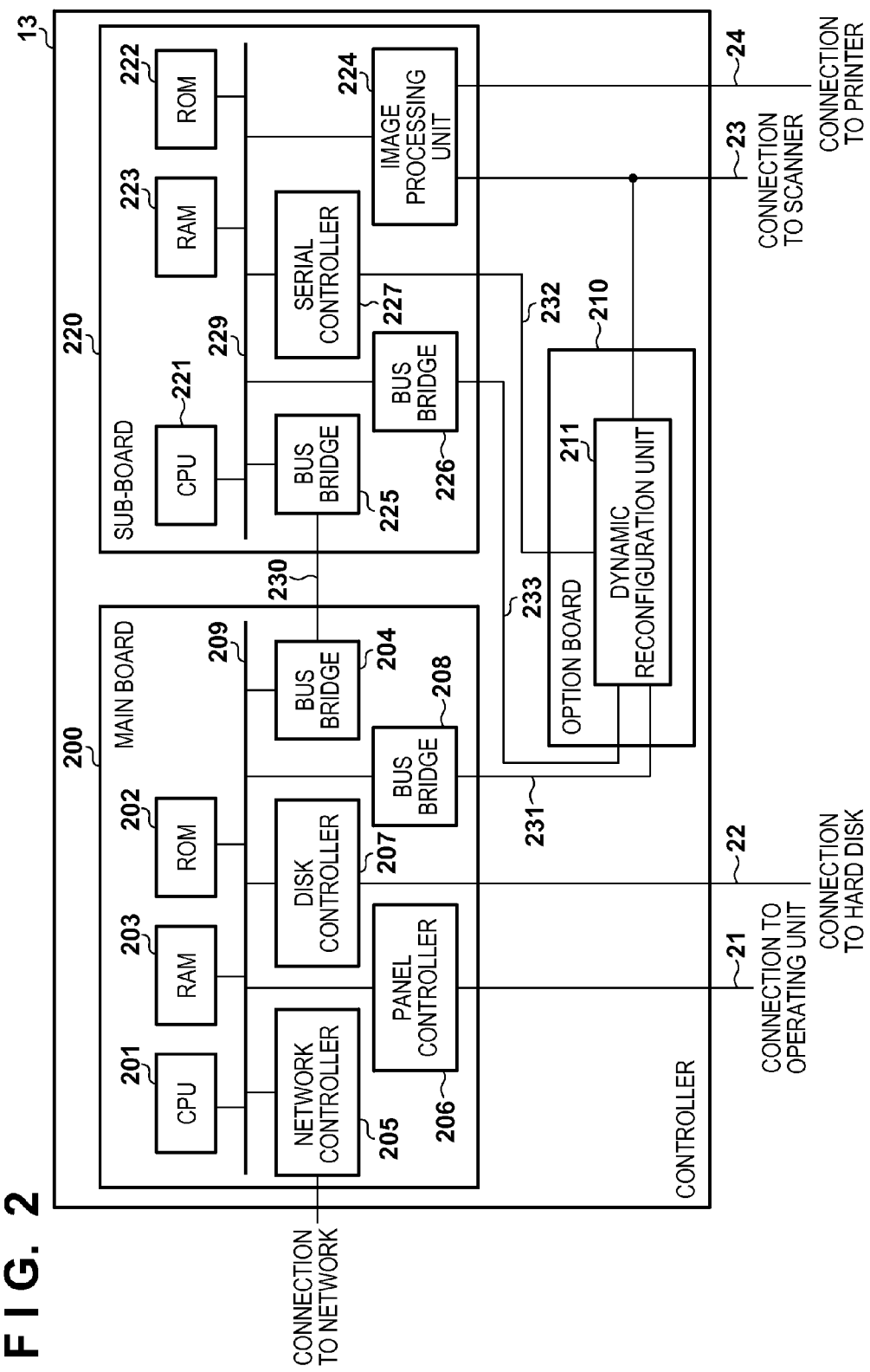
FIG. 2 is a diagram showing a block configuration of a controller.

FIG. 2 is a diagram showing a block configuration of the controller 13. The controller 13 includes a main board 200, a sub-board 220, and an option board 210. The main board 200 and the sub-board 220 are connected to each other via an external bus 230. The main board 200 and the option board 230 are connected to each other via an external bus 241. The sub-board 220 and the option board 210 are connected to each other via setting bus 232 and an external bus 233.

The operating unit 14 is connected to the main board 200 via the operating unit bus 21. The hard disk 15 is connected to the main board 200 via the hard disk bus 22. The scanner 16 is connected to the sub-board 220 and the option board 210 via the scanner bus 23. The printer 17 is connected to the sub-board 220 via the printer bus 24.

The main board 200 executes overall control of the image processing apparatus 10. The main board 200 is a general-purpose CPU system, and performs job control, connects to other boards using a general-purpose bus, and connects via a general-purpose bus to a storage device such as a hard disk, a network or the like. A CPU 201 controls the controller 13. A ROM 202 is a general-purpose ROM, and stores a boot program, for example. A RAM 203 is a general-purpose RAM, and is used as a work memory for the CPU 201, for example. A bus bridge 204 has a bridge function with the external bus 230. A bus bridge 208 has a bridge function with the external bus 231. A panel controller 206 controls the operating unit 14 via the operating unit bus 21. A disk controller 207 controls the hard disk 15 via the hard disk bus 22. A network controller 205 communicably connects the main board 200 to the network 12. The system bus 209 connects the modules included within the main board 200.

The sub-board 220 is an image processing CPU system that includes a configuration consisting of a connection with another board via a general-purpose bus, a connection with a scanner, a printer and the like via dedicated bus, and an image processing unit. A CPU 221 performs control within the sub-board 220. A ROM 222 is a general-purpose ROM, and stores a boot program, for example. A RAM 223 is a general-purpose RAM, and is used as a work memory for the CPU 221, for example. A bus bridge 225 has a bridge function with the external bus 230. A bus bridge 226 has a bridge function with the external bus 233. A serial controller 227 has a bridge function with the setting bus 232. An image processing unit 224 executes real time digital image processing on image data. For example, the image processing unit 224 performs image processing such as correction, processing and editing on image data input via the scanner bus 23. Also, the image processing unit 224 outputs image data that has undergone image processing such as correction according to print settings via the printer bus 24. The internal bus 229 connects the abovementioned modules of the sub-board 220 to each other. The sub-board 220 receives image data from and transmits read start instructions to the external scanner 16 via the scanner bus 23. Also, the sub-board 220 performs image data transmission and transmits print start instructions to the printer 17 via the printer bus 24.

The option board 210 includes a dynamic reconfiguration unit 211 connected to each of the external bus 231, the external bus 233, the setting bus 232, and the scanner bus 23. The dynamic reconfiguration unit 211 is able to dynamically configure an arbitrary circuit internally using configuration data input from the external bus 231, and is realized by a logic device such as an FPGA. The dynamic reconfiguration unit 211 configures the settings of the circuit dynamically configured internally using data input from the setting bus 232. Also, the dynamic reconfiguration unit 211 inputs image data input from the scanner bus 23 to the internally configured circuit, executes image processing using that circuit, and outputs the processed image data to the sub-board 220 via the external bus 233.

Although a large amount of peripheral hardware such as chip sets, bus bridges and clock generators, for example, are included in the CPU 201, the CPU 221 and the dynamic reconfiguration unit 211, description thereof will be omitted for convenience of description.

FIG. 3 is a diagram showing information on the correspondence between configuration data and page settings that is transferred to the dynamic reconfiguration unit 211. The correspondence information is shown in table form in FIG. 3, but may be realized in forms other than a table as long as the correspondence between configuration data and page settings is shown. A correspondence table 300 is stored in the ROM 202, for example. As shown in the correspondence table 300, the image processing that is applied differs according to the type of page. In the case of FIG. 3, if a page to be read in executing a scan job is an odd page with foreign matter, this corresponds to circuit data for performing foreign matter correction but not mirror image correction, and the image processing circuit is configured in the dynamic reconfiguration unit 211 using this circuit data. Foreign matter correction is processing that is performed in the case where foreign matter such as foreign particles on the document reading position is detected between pages when so-called moving document reading is performed from the ADF, and involves correcting pixels corresponding to the position of the foreign matter on the following page through interpolation or the like. Mirror image correction is processing performed in the case where image data is obtained as a mirror image due to the structure of the ADF or the reading mechanism such as the attachment orientation of the sensor, and involves correcting the image data of whichever of the front side or back side is the mirror image from the mirror image to the correct image.

Also, in the case where the page to be read is an odd page without foreign matter, the image processing circuit is configured in the dynamic reconfiguration unit 211 using circuit data for not performing foreign matter correction or mirror image correction. Also in the case where the page to be read is an even page with foreign matter, the image processing circuit is configured in the dynamic reconfiguration unit 211 using circuit data for performing foreign matter correction and mirror image correction. Also, in the case where the page to be read is an even page without foreign matter, the image processing circuit is configured in the dynamic reconfiguration unit 211 using circuit data for performing mirror image correction but not foreign matter correction.

As shown in FIG. 3, in the present embodiment, the configuration data for when foreign matter correction is performed on the following page and the configuration data for when foreign matter correction is not performed are exclusively used, according to the inter-page foreign matter reading result. Also, the configuration data for when performing mirror image correction on either the front or back side of the page (on an odd page or an even page) and the configuration data for when not performing mirror image correction are used exclusively, according to the structure of the ADF and the attachment direction of the reading device.

With the configuration data shown in FIG. 3, whether or not to execute foreign matter correction or mirror image correction is determined on a page-by-page basis, but it may be determined whether or not to enable a circuit for achromatic image processing or a circuit for chromatic image processing, according to the result of determining whether the read page is chromatic. The correspondence table 300 is constituted by a structure table or the like as a program. Also, the correspondence table 300 may, for example, be generated dynamically by the CPU 201, or stored in advance in a hard disk or a ROM.

Operation of Controller

Next, operations of the controller 13 will be described, taking the case where a document consisting of a plurality of sheets is read by executing a scan job as an example. However, other jobs such as a copy job or a print job may be executed, as long as processing is executed on a plurality of pages of image data. At the time the controller 13 executing a scan job, the CPU 201 of the main board 200 executes the scan job and the CPU 221 of the sub-board 220 executes page image processing. Furthermore, the CPU 201, the dynamic reconfiguration unit 211, the CPU 221 and the scanner 16 operate in tandem.

Job Processing

Figure 4:
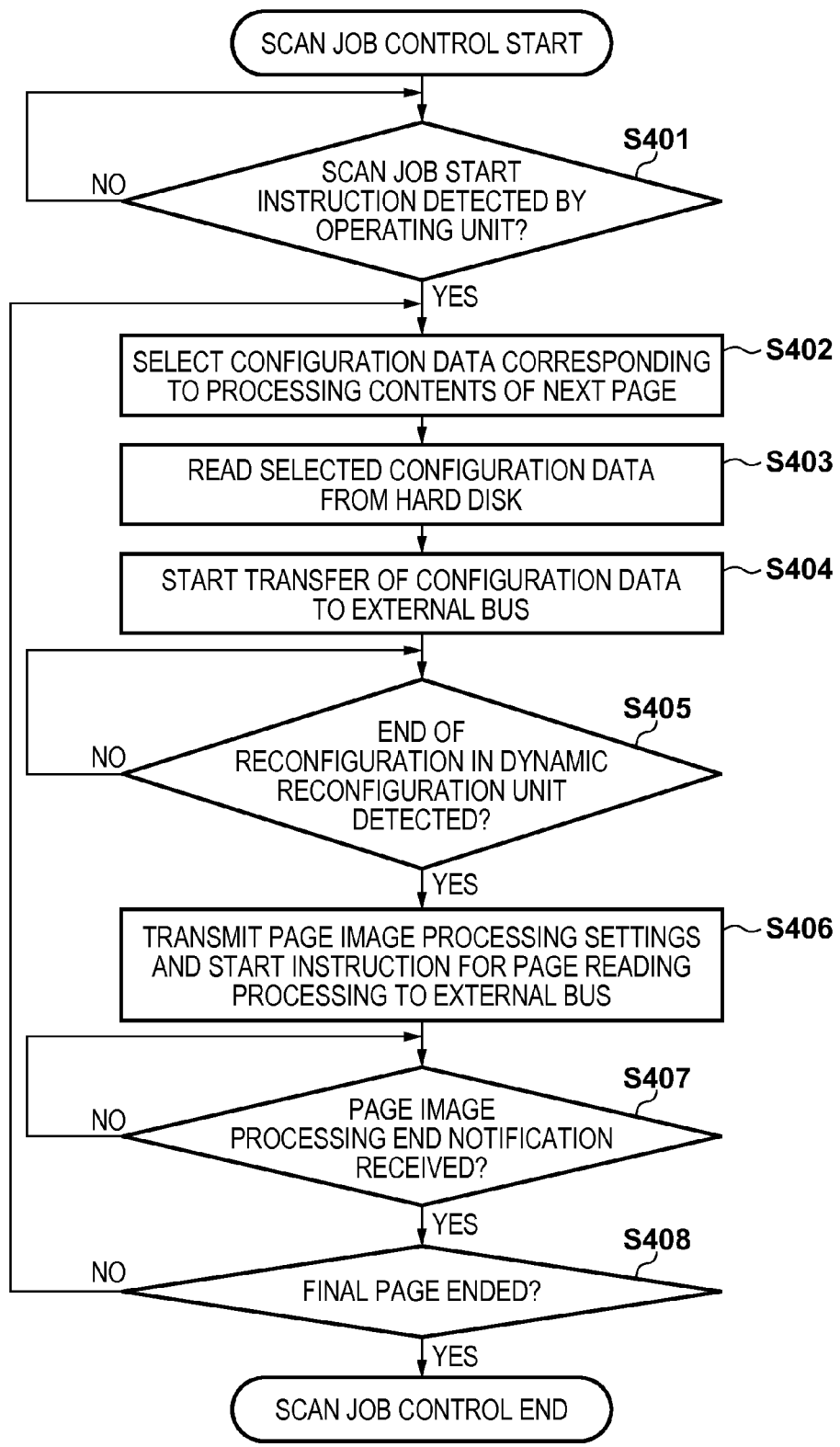
FIG. 4 is a flowchart showing a procedure for scan job processing.

FIG. 4 is a flowchart showing a procedure for scan job processing. The respective processing shown in FIG. 4 is, for example, realized by the CPU 201 reading a program stored in the ROM 202 or the hard disk 15 into the RAM 203 and executing the program.

In step S401, the CPU 201 determines whether a start instruction for scan job processing given by a user has been detected via the operating unit 14. If it is determined at step S401 that a start instruction for scan job processing has been detected, the procedure advances to step S402, and if it is determined that a start instruction for scan job processing has not been detected, the processing of step S401 is repeated.

In step S402, the CPU 201 selects the configuration data corresponding to the image processing required for the next page that follows, with reference to the correspondence table 300 shown in FIG. 3. In the present embodiment, foreign matter correction will be described as an example of image processing required for the next page.

With MFPs, there is a problem in that when moving document reading using an ADF is performed in a state where residual correction liquid, bits of paper or the like are stuck to the reading device as foreign particles or other foreign matter, black stripy images result. For this reason, first, one line of image data obtained by reading an unshown document guide board (white reference board) built into the scanner 16 is acquired prior to page reading. Next, the read value of each pixel is compared with the average value of all the read pixels, and it is determined that foreign matter is stuck to positions corresponding to pixels with respect to which the difference in values is greater than or equal to a threshold. If foreign matter is detected when reading of the white reference board for foreign matter detection is performed before processing each page, the processing of the next page that follows will necessarily involve foreign matter correction for performing correction after estimating the pixel data of pixels corresponding to the foreign matter from neighboring pixels. Here, if the next page is an odd page, the CPU 201 selects configuration data 0 with reference to the table 300 of FIG. 3, because the page is an odd page with foreign matter.

In step S402, the CPU 201 selects configuration data in the manner described above. In step S403, the CPU 201 reads the selected configuration data from the hard disk 15. In step S404, the CPU 201 transmits the configuration data read at step S403 to the dynamic reconfiguration unit 211 of the option board 210 via the bus bridge 208 and the external bus 231. Circuit reconfiguration in the dynamic reconfiguration unit 211 is thus started.

In step S405, the CPU 201 determines whether the end of reconfiguration in the dynamic reconfiguration unit 211 has been detected. For example, the CPU 201 determines whether the end of reconfiguration has been detected, based on reception of an interrupt signal by the external bus 231 or a reconfiguration end notification from the dynamic reconfiguration unit 211 via the external bus 231. If it is determined at step S405 that the end of reconfiguration has been detected, the procedure advances to step S406, and if it is determined that the end of reconfiguration has not been detected, the processing of step S405 is repeated.

In step S406, the CPU 201 transmits page image processing settings and a start instruction for page reading processing via the bus bridge 204 and the external bus 230, in order to cause the CPU 221 of the sub-board 220 to start page image processing control.

In step S407, the CPU 201 determines whether the bus bridge 204 has received, via the external bus 230, notification of the end of page image processing that is transmitted at the end of page image processing control executed by the CPU 221. If it is determined at step S407 that the bus bridge 204 has received notification of the end of page image processing, the procedure advances to step S408, and if it is determined that this notification has not been received, the processing of step S407 is repeated.

In step S408, the CPU 201 determines whether the processing of this flowchart has ended for the last page of the pages to be read in executing the scan job. Here, if it is determined that the processing has ended for the last page, the procedure shown in FIG. 4 is ended. On the other hand, if it is determined that the processing has not ended for the last page, the processing from step S402 is repeated.

Page Image Processing Control

Figure 5:
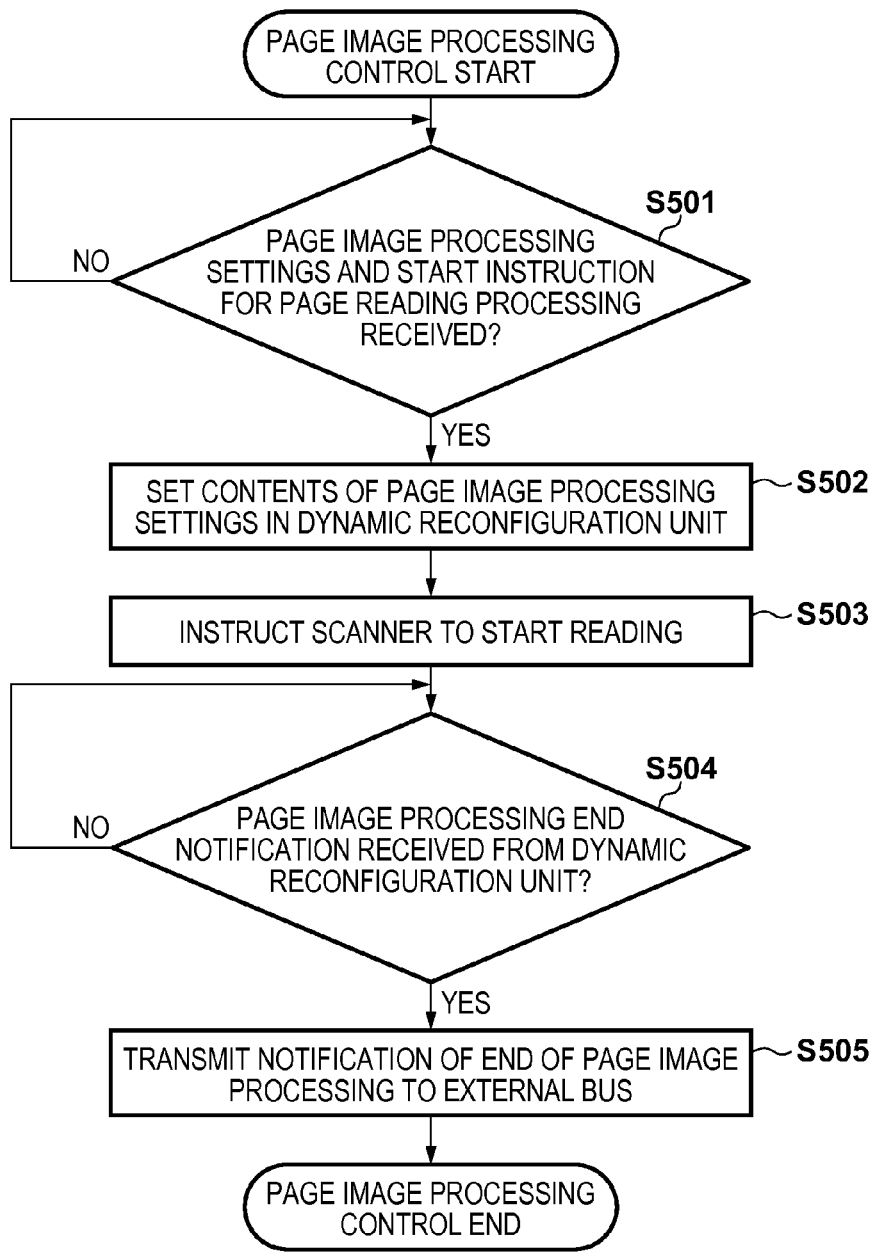
FIG. 5 is a flowchart showing a procedure for image processing control on a page-by-page basis.

FIG. 5 is a flowchart showing a procedure for image processing control on a page-by-page basis. The respective processing shown in FIG. 5 is realized, for example, by the CPU 221 reading a program stored in the ROM 222 or the hard disk 15 into the RAM 223 and executing the program.

In step S501, the CPU 221 determines whether the bus bridge 225 has received page image processing settings and a start instruction for page reading processing via the external bus 230. If it is determined at step S501 that page image processing settings and a start instruction for page reading processing have been received, the procedure advances to step S502, and if it is determined that the settings and start instruction have not been received, the processing of step S501 is repeated.

In step S502, the CPU 221 sets the page image processing settings in the image processing unit 224 and in the dynamic reconfiguration unit 211 via the serial controller 227 and the setting bus 232. A page image processing setting is setting information on image processing that is executed by an image processing circuit configured in the dynamic reconfiguration unit 211, and in the case of the foreign matter correction circuit, for example, is a correction condition such as the number of pixels to be interpolated.

In step S503, the CPU 221 controls the scanner 16 to start reading, via the image processing unit 224 and the scanner bus 23. This control is realized by some of the dedicated signal lines on the scanner bus 23 or commands using communication lines on the scanner bus 23, for example. As a result of the processing of step S503, the scanner 16 starts reading of the document and image data output from the scanner 16 is input to the dynamic reconfiguration unit 211. The image data image processed by the dynamic reconfiguration unit 211 is stored by the dynamic reconfiguration unit 211 in the RAM 223 of the sub-board 220 via the external bus 233 and the bus bridge 226.

In step S504, the CPU 221 determines whether the bus bridge 226 has received notification of the end of page image processing from the dynamic reconfiguration unit 211 via the external bus 233. The determination processing of step S504 is realized as an interrupt signal on the external bus 233 showing the end of image processing on one page of image data calculated from the setting information set at step S502 by the image processing circuit configured in the dynamic reconfiguration unit 211, for example. Alternatively, a configuration may be adopted in which the bus bridge 226 detects that the transfer of image data output from the dynamic reconfiguration unit 211 has ended. If it is determined at step S504 that the bus bridge 226 has received notification of the end of page image processing, the procedure advances to step S505, and if it is determined that this notification has not been received, the processing of step S504 is repeated. In step S505, the CPU 221 transmits the notification of the end of page image processing to the CPU 201 via the bus bridge 225 and the external bus 230, and ends the processing of FIG. 5.

Tandem Operation at the Time of Job Execution

A sequence in which the CPU 201, the CPU 221, the dynamic reconfiguration unit 211 and the scanner 16 operate in tandem will be described with reference to FIG. 6.

Figure 6:
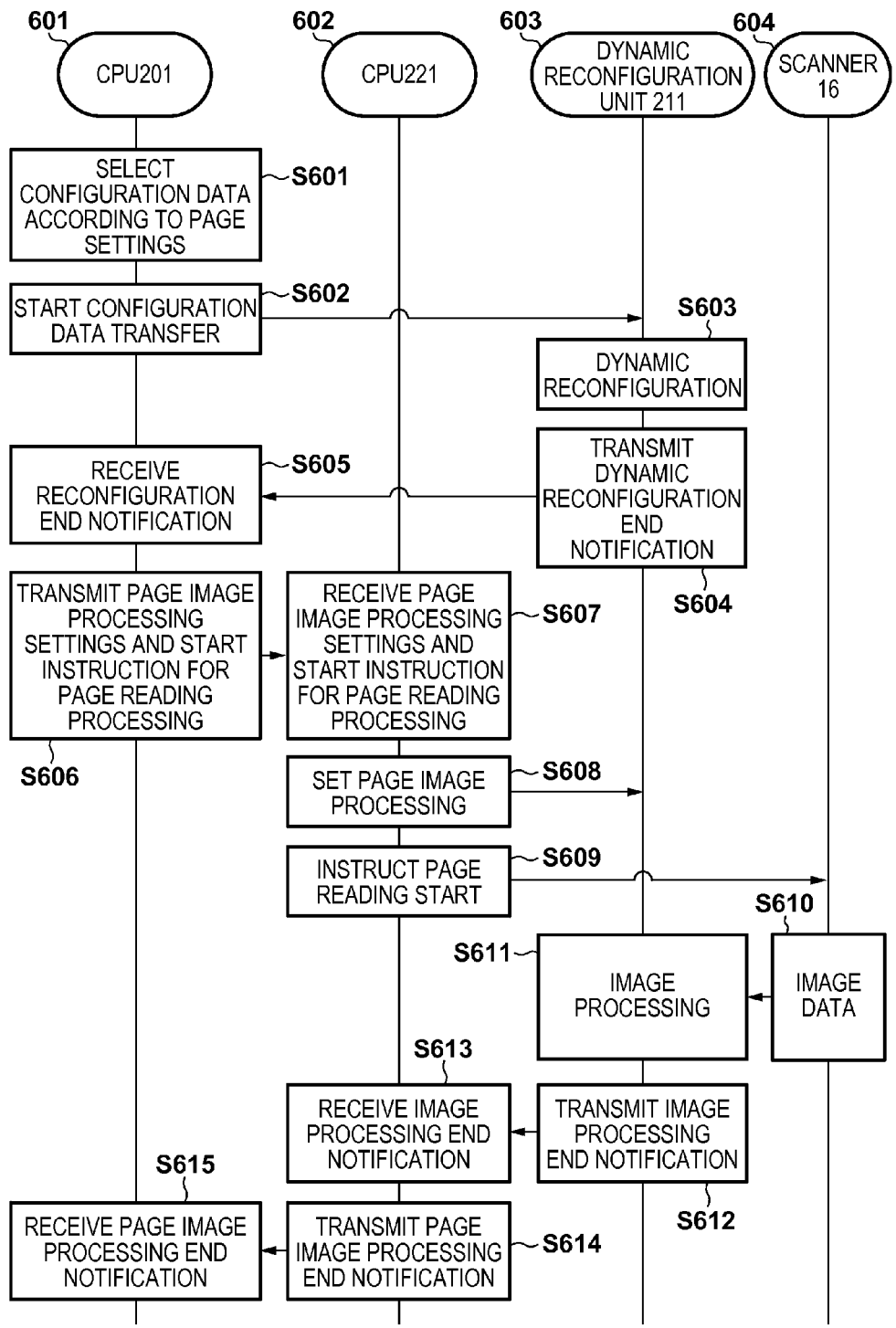
FIG. 6 is a diagram showing a sequence of image processing control on a page-by-page basis.

FIG. 6 is a sequence diagram representing the flowcharts of FIG. 4 that is executed by the CPU 201 and FIG. 5 that is executed by the CPU 221 in time series. Processing 601 indicates processing that is executed by the CPU 201. Processing 602 indicates processing that is executed by the CPU 221. Processing 603 indicates processing that is executed by the dynamic reconfiguration unit 211. Processing 604 indicates processing that is executed by the scanner 16.

In step S601, the CPU 201 selects configuration data corresponding to the page image processing settings. Next, in step S602, the CPU 201 starts transferring the selected configuration data to the dynamic reconfiguration unit 211. The dynamic reconfiguration unit 211, having received the configuration data, performs circuit reconfiguration in step S603, and transmits an end notification to the CPU 201 in step S604 when the reconfiguration ends. In step S605, the CPU 201 receives the notification of the end of dynamic reconfiguration.

In step S606, the CPU 201 transmits page image processing settings and a start instruction for page reading processing to the CPU 221. In step S607, the CPU 221 receives the page image processing settings and the start instruction for page reading processing. In step S608, the CPU 221 transmits the page image processing settings received at step S607 to the dynamic reconfiguration unit 211. Then, in step S609, the CPU 221 instructs the scanner 16 to start page reading via the image processing unit 224 and the scanner bus 23.

In step S610, the scanner 16 generates image data by optically reading the document, and transmits image data to the dynamic reconfiguration unit 211. This image data is image data corresponding to the page with respect to which the start of page reading was instructed. In step S611, the dynamic reconfiguration unit 211 executes image processing on the image data transmitted at step S610, using the image processing circuit reconfigured at step S603.

In step S612, the dynamic reconfiguration unit 211 transmits notification of the end of image processing to the CPU 221 when image processing on the page ends. Here, the dynamic reconfiguration unit 211 transmits notification of the end of image processing, in the case where, for example, a synchronization signal indicating the end of the effective region of the page in the image data or the like is detected or a value exceeding a threshold is detected in the image processing determination. In step S613, the CPU 221 receives the notification of the end of image processing. As a result, the CPU 221 is able to recognize the end of page image processing. In step S614, the CPU 221 transmits the notification of the end of page image processing to the CPU 201. In step S615, the CPU 201 receives the notification of the end of page image processing. As a result, the CPU 201 is able to recognize the end of page image processing.

As a result of the above sequence of steps S601 to S615, the page sequence of tandem operation for one page of a scan job is completed. Note that, although not illustrated in FIG. 6, the determination processing of step S408 in FIG. 4 is subsequently performed, and if it is determined not to be the last page, the procedure returns to step S601. The scan job is executed by repeating steps S601 to S615 for every page.

According to the present embodiment, with regard to a scan job performed in tandem by the CPU 201 and the CPU 221, an image processing circuit is configured in the dynamic reconfiguration unit 211 by the CPU 201, enabling image processing of read image data to be performed on a page-by-page basis by the dynamic reconfiguration unit 211. Circuits that are configured in a device capable of dynamic reconfiguration can be changed even after completion of the image processing apparatus. Therefore, in the present embodiment, the foreign matter correction circuit and mirror image correction circuit that are modified after completion of image processing apparatus can be readily applied to execution of a scan job. Also, because dynamic reconfiguration in the dynamic reconfiguration unit 603 is performed on a page-by-page basis, as shown in step S603 of FIG. 6, the present invention can also be readily adapted to cases where, for example, the gate scale of an FPGA is restricted.

Note that although, in the present embodiment, a scan job was described as an example, the same applies to a job that is executed on image data having a plurality of pages, such as a copy job that realizes a copy function, for example.

Second Embodiment

In the first embodiment, the CPU 201 performs dynamic reconfiguration of circuits in the dynamic reconfiguration unit 211, and the CPU 221 instructs the start of page reading. The present embodiment describes a configuration that is able to further improve the processing efficiency of the overall job by shortening the page acquisition interval in the operations of the first embodiment.

Configuration of Image Processing Apparatus

The configuration of the image processing apparatus in the present embodiment is similar to the description in FIG. 1. Furthermore, the configuration of the controller 13 is similar to the description in FIG. 2.

Figure 7:
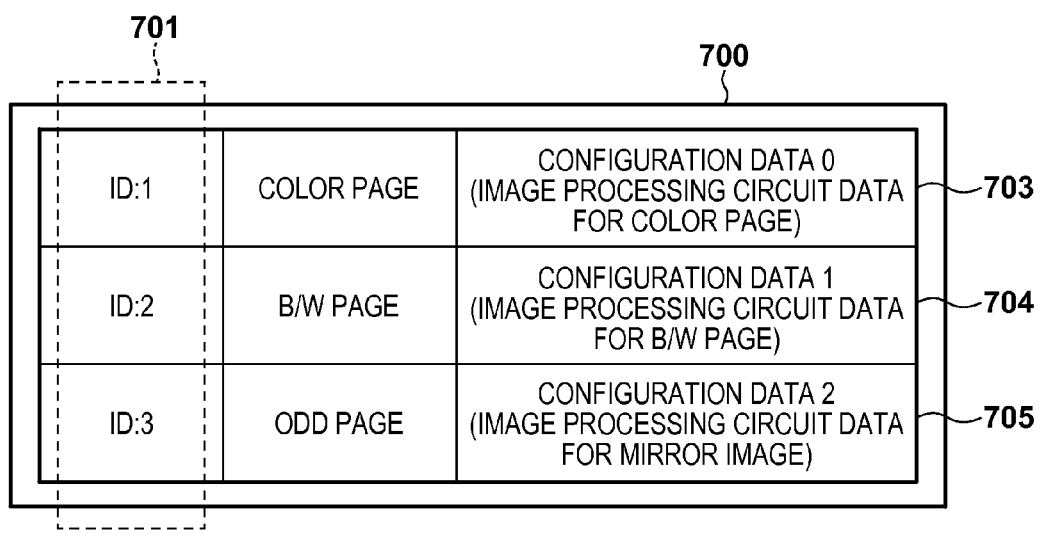
FIG. 7 is another diagram showing a correspondence between configuration data and page settings.

FIG. 7 is a diagram showing correspondence information in which a plurality of configuration data transferred to the dynamic reconfiguration unit 211 are associated with page settings. The correspondence information is shown in the form of a table in FIG. 7, but may be realized in forms other than a table, as long as the correspondence between configuration data and page settings is shown. Lines 703, 704 and 705 of a table 700 show image processing circuits associated with types of pages to be read. Also, the lines 703 to 705 are each identified by an ID 701.

Line 703, which is identified by ID "1", corresponds to an image processing circuit for color pages. Color pages use images in which intermediate gradations are heavily used such as photographs. Therefore, the image processing circuit for color pages performs image region separation of text, photographs and the like, and executes image processing that depends on each image region. In addition, because the image may appear to have deteriorated due to texture being produced when edges are strongly enhanced, for example, image processing that reduces gamma is executed in the image processing circuit for color pages. Such an image processing circuit optimized for color pages is configured in the dynamic reconfiguration unit 211.

Line 704, which is identified by ID "2", corresponds to an image processing circuit for black-and-white pages. The image processing circuit for black-and-white pages performs image region separation of half-tone photographs, text and the like, and executes image processing according to each image region. Also, this circuit executes image processing that enhances clarity by increasing gamma. Such an image processing circuit optimized for black-and-white pages is configured in the dynamic reconfiguration unit 211.

The image processing circuit for color pages and the image processing circuit for black-and-white pages are exclusively used according to whether the page to be read is achromatic or chromatic, as a result of the chromatic determination processing of a page performed before document reading.

Line 705, which is identified by ID "3", corresponds to an image processing circuit that performs mirror image correction (mirror image reversal). The image processing circuit for mirror image processing executes mirror image correction on whichever of the front side or back side (odd pages or even pages) is a mirror image due to the structure of the ADF or the attachment direction of the reading device. In FIG. 7, executing mirror image correction on odd pages is determined.

The table 700 defines the configuration specifications of the dynamic reconfiguration unit 211, as mentioned above. The table 700 is defined by a structure or the like in a program. The table 700 may be dynamically generated by the CPU 201 and may be stored in advance in the hard disk 15 or the ROM 202.

Job Processing

Next, operations of the controller 13 will be described, taking the case where a document consisting of a plurality of sheets is read by executing a scan job as an example. However, another job such as a copy and a print may be executed, as long as processing is executed on a plurality of pages of image data. At the time of a scan job being executed by the controller 13, the CPU 201 of the main board 200 executes the scan job, and the CPU 221 of the sub-board 220 executes page image processing. Furthermore, the CPU 201, the dynamic reconfiguration unit 211, the CPU 221 and the scanner 16 operate in tandem.

Figure 8:
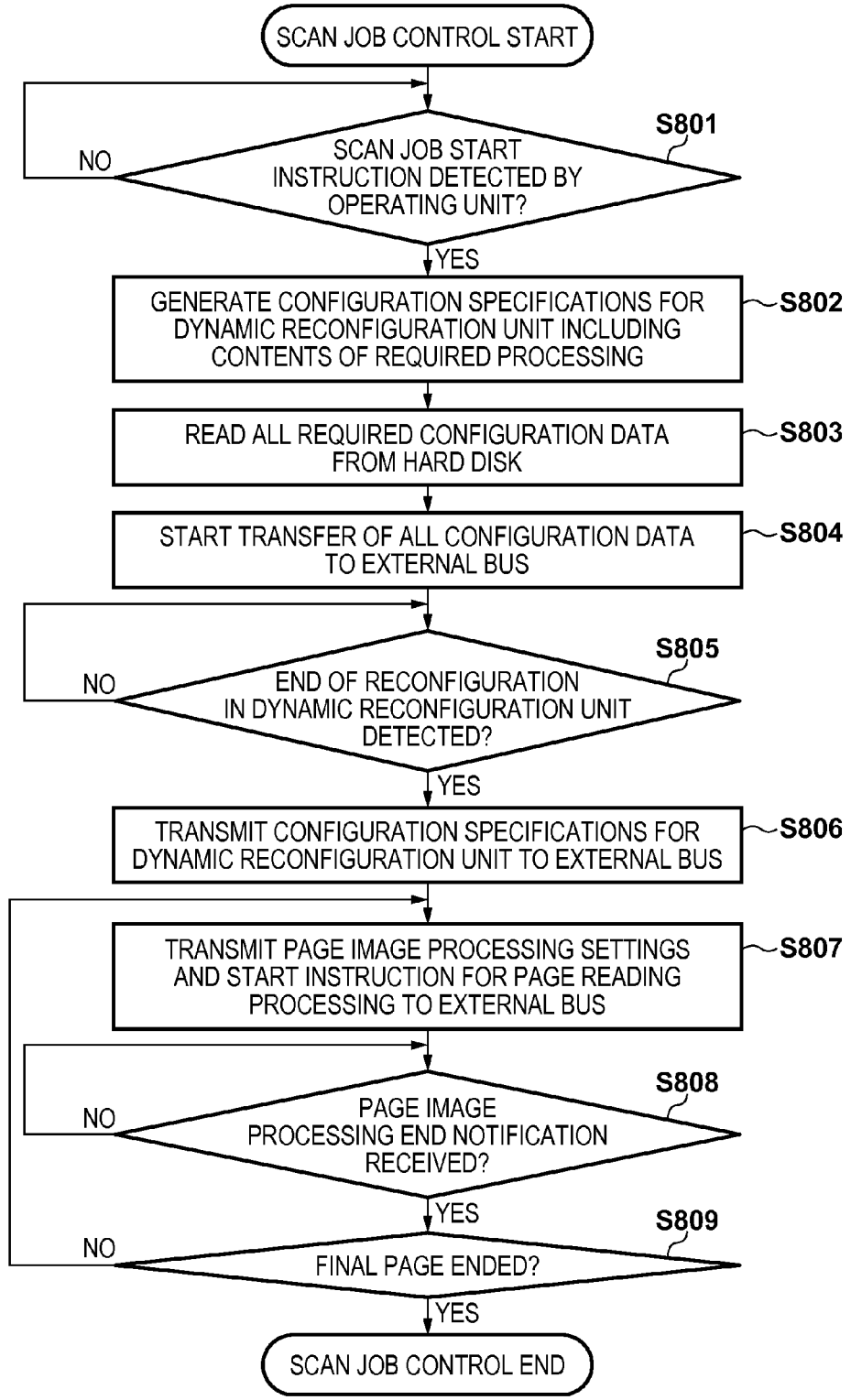
FIG. 8 is another flowchart showing a procedure for scan job processing.

FIG. 8 is a flowchart showing a procedure for scan job processing. The respective processing shown in FIG. 8 is realized, for example, by the CPU 201 reading a program stored in the ROM 202 or the hard disk 15 to the RAM 203 and executing the program.

In step S801, the CPU 201 determines whether a start instruction for scan job processing given by a user has been detected via the operating unit 14. If it is determined at step S801 that a start instruction for scan job processing has been detected, the procedure advances to step S802, and if it is determined that a start instruction for scan job processing has not been detected, the processing of step S801 is repeated.

In step S802, the CPU 201 generates a table 700 that includes the contents of image processing used in the scan job. In step S803, the CPU 201 reads all of the configuration data that is needed to execute the scan job from the hard disk 15. In the present embodiment, the configuration data 0 to 2 corresponding to IDs "1" to "3" in FIG. 7 are read from the hard disk 15.

In step S804, the CPU 201 transfers the configuration data read at step S803 to the dynamic reconfiguration unit 211 via the bus bridge 208 and the external bus 231. Circuit reconfiguration in the dynamic reconfiguration unit 211 is thus started. In step S805, the CPU 201 determines whether the end of reconfiguration in the dynamic reconfiguration unit 211 has been detected. For example, the CPU 201 determines whether the end of reconfiguration has been detected, based on reception of an interrupt signal via the external bus 231 or a reconfiguration end notification using the external bus 231 from the dynamic reconfiguration unit 211. If it is determined at step S805 that the end of reconfiguration has been detected, the procedure advances to step S806, and if it is determined that the end of reconfiguration has not been detected, the processing of step S805 is repeated. At the point in time that reconfiguration in the dynamic reconfiguration unit 211 ends, the plurality of types of image processing circuits shown in FIG. 7 have been configured in the dynamic reconfiguration unit 211.

In step S806, the CPU 201 transmits the table 700 to the bus bridge 225 of the sub-board 220 via the bus bridge 204 and the external bus 230, after detecting the end of reconfiguration in the dynamic reconfiguration unit 211. The CPU 221 of the sub-board 220 is able to recognize what types of image processing circuits were reconfigured in the dynamic reconfiguration unit 211, by acquiring the table 700 from the bus bridge 225.

In step S807, the CPU 201 transmits page image processing settings and a start instruction for page reading processing via the external bus 230, in order to cause the CPU 221 of the sub-board 220 to start page image processing control. In step S808, the CPU 201 determines whether the bus bridge 204 has received notification of the end of page image processing transmitted at the time of the end of the page image processing control executed by the CPU 221 via the external bus 230. If it is determined at step S808 that the bus bridge 204 has received notification of the end of page image processing, the procedure advances to step S809 and if it is determined that this notification has not been received, the processing of step S808 is repeated.

In step S809, the CPU 201 determines whether processing of this flowchart has ended for the last page of the pages to be processed in executing the scan job. Here, if it is determined that the processing has ended for the last page, the procedure shown in FIG. 8 is ended. On the other hand, if it is determined that the processing has not ended for the last page, the processing from step S807 is repeated.

Page Image Processing Control

FIG. 9 is a flowchart showing a procedure for image processing control on a page-by-page basis. The respective processing shown in FIG. 9 is realized, for example, by the CPU 221 reading a program stored in the ROM 222 or the hard disk 15 to the RAM 223 and executing the program.

In step S901, the CPU 221 determines whether the bus bridge 225 has received the table 700 via the external bus 230. If it is determined at step S901 that the table 700 has been received, the procedure advances to step S902, and if it is determined that the table 700 has not been received, the processing of step S901 is repeated.

In step S902, the CPU 221 determines whether the bus bridge 225 has received page image processing settings and a start instruction for page reading processing via the external bus 230. If it is determined at step S902 that page settings and a start instruction for page reading processing have been received, the procedure advances to step S903, and if it is determined that the page settings and the start instruction have not been received, the processing of step S902 is repeated.

In step S903, the CPU 221 selects a configuration ID 701 corresponding to page information of the page to be read from the page information of the current reading target, with reference to the table 700. The CPU 221 then transmits the selected configuration ID 701 to the dynamic reconfiguration unit 211 via the setting bus 232, and activates one of the image processing circuits respectively corresponding to the image processing of lines 703 to 705 of the table 700.

Figure 11:
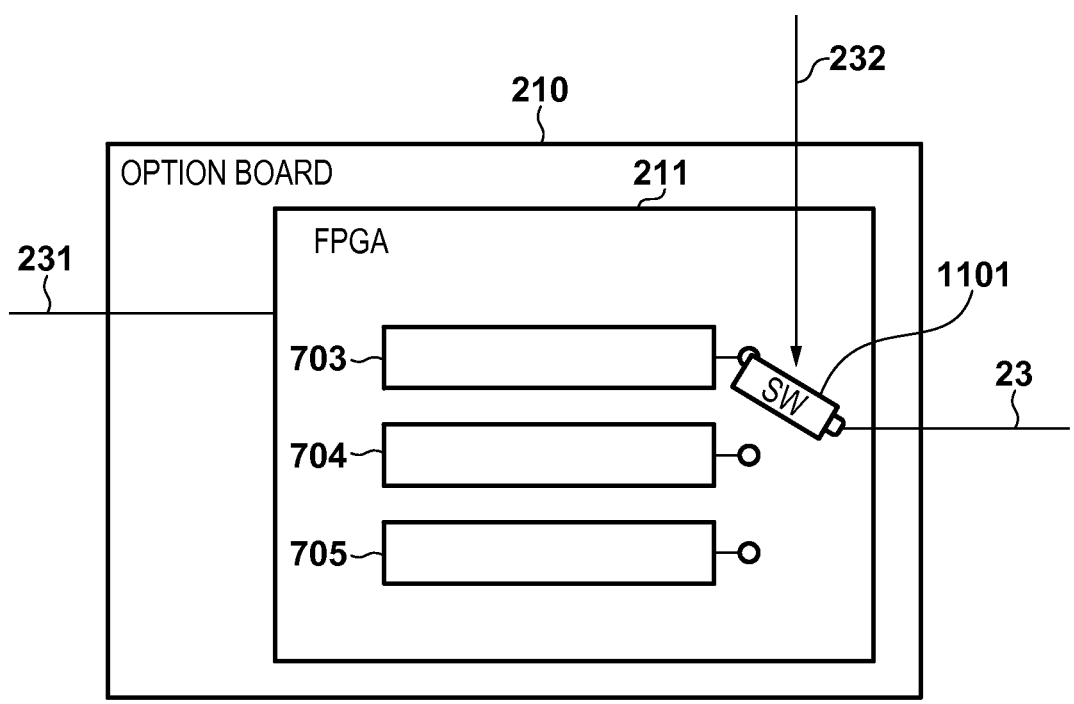
FIG. 11 is a diagram showing a switching configuration of an image processing circuit.

Selection of a configuration ID 701 will be described with reference to FIG. 11. As shown in FIG. 11, the image processing circuits 703 to 705 respectively corresponding to the configuration IDs "1" to "3" defined by the table 700 are configured to be changeable by the dynamic reconfiguration unit 211 when a reconfiguration end notification is received from the dynamic reconfiguration unit 211 at step S805. In step S903, the CPU 221 transmits the configuration ID 701 selected via the setting bus 232 and changes a switch 1101. This change configuration enables the image processing circuit that executes image processing on image data received via the scanner bus 23 to be dynamically changed at an arbitrary timing, without the mediation of the CPU 201. In the present embodiment, changing of the image processing circuits 703 to 705 is configured as a switch that can be exclusively selected. However, a configuration may be adopted in which a plurality of image processing circuits are connected in a pipeline manner, and can be sequentially activated/deactivated.

In step S904, the CPU 221 sets the page image processing settings received at step S902 in the image processing unit 224 and an image processing circuit configured in the dynamic reconfiguration unit 211. For example, in the state showing in FIG. 11, the page image processing settings are set in the image processing circuit 703. The page image processing settings are set similarly to the description in the first embodiment.

In step S905, the CPU 221 controls the scanner 16 to start reading, via the image processing unit 224 and the scanner bus 23. This is realized by some of the dedicated signal lines of the scanner bus 23 or commands using communication lines on the scanner bus 23, for example. As a result of the processing of step S503, the scanner 16 starts reading of the document, and image data that is output from the scanner 16 is input to the dynamic reconfiguration unit 211. The image data that has undergone image processing in the dynamic reconfiguration unit 211 is stored by the dynamic reconfiguration unit 211 in the RAM 223 of the sub-board 220 via the external bus 233 and the bus bridge 226.

In step S906, the CPU 221 determines whether the bus bridge 226 has received notification of the end of page image processing from the dynamic reconfiguration unit 211 via the external bus 233. Determination processing of step S906 is realized, for example, as an interrupt signal on the external bus 233 indicating the end of image processing of one page of image data calculated from the page image processing settings set up at step S904 in the image processing circuit configured in the dynamic reconfiguration unit 211. Alternatively, a configuration may be adopted in which the bus bridge 226 detect that transfer of image data from the dynamic reconfiguration unit 211 has ended. If it is determined that the bus bridge 226 has received notification of the end of page image processing at step S906, the procedure advances to step S907, and if it is determined that this notification has not been received, the processing of step S906 is repeated. In step S907, the CPU 221 transmits notification of the end of page image processing to the CPU 201 via the bus bridge 225 and the external bus 230, and ends the procedure in FIG. 9.

Tandem Operation at the Time of Job Execution

A sequence in which the CPU 201, the CPU 221, the dynamic reconfiguration unit 211 and the scanner 16 operate in tandem will be described with reference to FIGS. 10A and 10B.

Figure 10B:
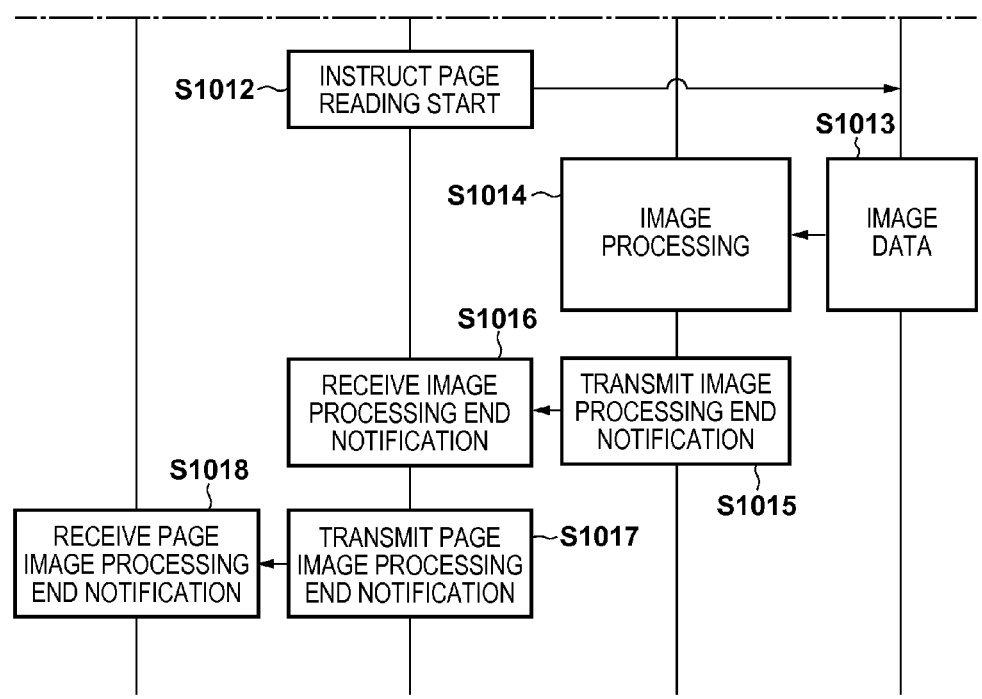

FIGS. 10A and 10B are sequence diagrams representing the flowcharts of FIG. 8 that is executed by the CPU 201 and FIG. 9 that is executed by the CPU 221 in time series. Processing 1001 indicates processing that is executed by the CPU 201. Processing 1002 indicates processing that is executed by the CPU 221. Processing 1003 indicates processing that is executed by the dynamic reconfiguration unit 211. Processing 1004 indicates processing that is executed by the scanner 16.

In step S1001, the CPU 201 generates a table 700 including all of the contents of image processing used in a scan job. In step S1002, the CPU 201 starts transferring the configuration data 0 to 2 corresponding to the image processing circuits 703 to 705 to the dynamic configuration unit 211. After transfer has been started, the dynamic configuration unit 21, in step S1003, starts configuring the internal image processing circuits 703 to 705. In step S1004, the dynamic configuration unit 211 transmits an end notification to the CPU 201 at the time of the end of dynamic reconfiguration. In step S1005, the CPU 201 receives notification of the end of dynamic reconfiguration.

In step S1006, the CPU 201 transmits the table 700 shown in FIG. 7 to the CPU 221. The CPU 221 receives the table 700. As a result, the CPU 221 is able to recognize what types of image processing circuits have being configured in the dynamic reconfiguration unit 211, and is able to recognize the configuration ID corresponding to each image processing circuit.

In step S1007, the CPU 201 transmits page image processing settings and a start instruction for page reading processing to the CPU 221. In step S1008, the CPU 221 receives the page image processing settings and the start instruction for page reading processing.

In step S1009, the CPU 221 selects an configuration ID 701 from the table 700 based on the page image processing settings received at step S1008, and transmits selected configuration ID 701 to the dynamic reconfiguration unit 211. In step S1010, the switch 1101 of the dynamic reconfiguration unit 211 changes such that the image processing circuit corresponding to configuration ID 701 transmitted in step S1009 is activated. In step S1011, the CPU 221 transmits the page image processing settings received at step S1008 to the dynamic reconfiguration unit 211. In step S1012, the CPU 221 then instructs the scanner 16 to start page reading, via the image processing unit 224 and the scanner bus 23.

In step S1013, the scanner 16 generates image data by optically reading the document, and transmits the image data to the dynamic reconfiguration unit 211. This image data is image data corresponding to the page with respect to which the start of page reading was instructed. In step S1014, the dynamic reconfiguration unit 211 executes image processing on image data transmitted at step S1013, using the image processing circuit activated by the switch 1101.

In step S1015, the dynamic reconfiguration unit 211 transmits notification of the end of image processing to the CPU 221 when image processing on this page ends. Here, the dynamic reconfiguration unit 211 transmits notification of the end of image processing, in the case where, for example, a synchronization signal indicating the end of the effective region of the page in image data or the like is detected or a value exceeding a threshold in the image processing determination or the like is detected. In step S1016, the CPU 221 receives the notification of the end of image processing. As a result, the CPU 221 is able to recognize the end of page image processing. In step S1017, the CPU 221 transmits the notification of the end of page image processing to the CPU 201. In step S1018, the CPU 201 receives the notification of the end of page image processing. As a result, the CPU 201 is able to recognize the end of page image processing.

Although not illustrated in FIGS. 10A and 10B, processing for determining the last page of step S809 in FIG. 8 is performed after the processing of step S1018, and the procedure returns to step S1007 if it is determined not to be the last page. That is, in the present embodiment, the CPU 201 does not perform the processing of step S1003 for every page. Instead, image processing is executed in step S1014 by the CPU 221 changing the switch 1101 via the setting bus 232 for every page to be read.

The present embodiment differs from the first embodiment in that in step S1010 the CPU 221 selects an image processing circuit that is configured in the dynamic reconfiguration unit 211. In the present embodiment, the CPU 201 initially performs reconfiguration in the dynamic reconfiguration unit 211 only once, and thus even in the case where the dynamic reconfiguration unit 211 has a limited number of writings due to a NAND process or the like, the rate at which the limited number of writings are consumed can be reduced. Also, compared with the first embodiment that performs circuit reconfiguration at the timing of each interval between pages, the processing time between pages during scanning can be shortened, and, as a result, the processing efficiency of the overall scan job can be further improved.

Also, changing in the dynamic reconfiguration unit 211 must be performed when image data is not being communicated on the scanner bus 23, and thus needs to be performed after detecting the end of scanning. In the present embodiment, the CPU 221 that controls the scanner 16 performs changing, and thus changing can be performed quickly immediately after detecting the end of scanning. As a result, it becomes possible, for example, to scan continuously without affecting the continuous feeding operation of the ADF.

Although, the above embodiments were described in terms of scanning being performed using image processing circuits that have been dynamically configured, a configuration may be adopted in which image processing circuits are also dynamically configured on a page-by-page basis at the time of executing other types of jobs. For example, the configurations of FIGS. 1 and 2 may be adopted with regard to a print job, and image processing according to each page may be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-255442, filed Dec. 17, 2014, which is hereby incorporated by reference herein in its entirety.

What is claimed is:

1. An image processing apparatus comprising:
an acquisition unit configured to acquire, as a target for job execution, image data that includes a plurality of pages;
a determination unit configured to determine image processing corresponding to each of the plurality of pages of the acquired image data;
a logic device including at least one dynamically configurable image processing circuit, wherein the logic device is configured to dynamically configure the at least one image processing circuit for executing the determined image processing; and
a control unit configured to cause the at least one image processing circuit configured in the logic device to execute the determined image processing for each of the plurality of pages of the acquired image data.

2. The image processing apparatus according to claim 1, wherein the logic device is further configured to dynamically configure, for each page of the image data, an image processing circuit of the at least one image processing circuit for executing image processing corresponding to the page.

3. The image processing apparatus according to claim 1, wherein the logic device includes a plurality of dynamically configurable image processing circuits and is further configured to dynamically configure the plurality of image processing circuits corresponding to the plurality of pages of the image data, prior to the acquisition unit acquiring the image data.

4. The image processing apparatus according to claim 3, wherein in a case where the image processing determined by the determination unit is associated with a mechanism for the acquisition unit to acquire the image data, the logic device is configured to dynamically configure the plurality of image processing circuits corresponding to the plurality of pages of the image data, prior to the acquisition unit acquiring the image data.

5. The image processing apparatus according to claim 3, wherein the logic device is configured to dynamically configure the plurality of image processing circuits such that any of the plurality of image processing circuits is selectable.

6. The image processing apparatus according to claim 3, further comprising:
a selection unit configured to select an image processing circuit for executing image processing corresponding to each of the plurality of pages of the image data from the plurality of image processing circuits configured in the logic device,
wherein the control unit causes the image processing circuit selected by the selection unit to perform the image processing.

7. The image processing apparatus according to claim 6, further comprising:
a first processor; and
a second processor,
wherein the control unit is executed by the first processor, and the selection unit is executed by the second processor.

8. The image processing apparatus according to claim 7, wherein the second processor, as a result of an instruction from the first processor, executes the acquisition unit so as to acquire the image data and transmit the acquired image data to the logic device.

9. The image processing apparatus according to claim 1, wherein the acquisition unit acquires the image data by optically reading a document.

10. The image processing apparatus according to claim 1, further comprising:
a storage unit configured to store information on a correspondence between pages and image processing,
wherein the determination unit determines image processing corresponding to each of the plurality of pages of the image data acquired by the acquisition unit, based on the correspondence information stored in the storage unit.

11. The image processing apparatus according to claim 1, wherein the image processing includes processing for correcting image data.

12. The image processing apparatus according to claim 11, wherein the image processing includes at least one of foreign matter correction and mirror image correction.

13. The image processing apparatus according to claim 1, wherein the logic device includes an FPGA.

14. A control method to be executed in an image processing apparatus that includes a logic device including at least one dynamically configurable image processing circuit, comprising:
determining image processing corresponding to each of a plurality of pages of image data to be acquired as a target for job execution;
dynamically configuring the at least one image processing circuit for executing the determined image processing;
acquiring, as the target for job execution, the image data; and
causing the dynamically configured image processing circuit to execute the image processing for each of the plurality of pages of the acquired image data.

15. A non-transitory computer-readable storage medium storing a computer program for causing a computer to execute a control method for an image processing apparatus, the control method including:
determining image processing corresponding to each of a plurality of pages of image data to be acquired as a target for job execution;
dynamically configuring, in a logic device including at least one dynamically configurable image processing circuit, the at least one image processing circuit for executing the determined image processing;
acquiring, as the target for job execution, the image data; and
causing the dynamically configured image processing circuit to execute the image processing for each of the plurality of pages of the acquired image data.

* * * * *